(12) United States Patent
Nazarian et al.

(10) Patent No.: US 9,815,626 B2
(45) Date of Patent: Nov. 14, 2017

(54) METHOD OF STORING $CO_2$

(71) Applicant: STATOIL PETROLEUM AS, Stavanger (NO)

(72) Inventors: Bamshad Nazarian, Ranheim (NO); Philip Sefton Ringrose, Trondheim (NO)

(73) Assignee: STATOIL PETROLEUM AS, Stavanger (NO)

( * ) Notice: Subject to any disclaimer, the term of this patent is extended or adjusted under 35 U.S.C. 154(b) by 0 days.

(21) Appl. No.: 14/784,374

(22) PCT Filed: Apr. 17, 2014

(86) PCT No.: PCT/EP2014/057955
§ 371 (c)(1),
(2) Date: Oct. 14, 2015

(87) PCT Pub. No.: WO2014/170455
PCT Pub. Date: Oct. 23, 2014

(65) Prior Publication Data
US 2016/0075514 A1    Mar. 17, 2016

(30) Foreign Application Priority Data
Apr. 17, 2013    (WO) ............... PCT/EP2013/058031

(51) Int. Cl.
*B65G 5/00* (2006.01)
*C09K 8/00* (2006.01)
*E21B 41/00* (2006.01)

(52) U.S. Cl.
CPC ............... *B65G 5/00* (2013.01); *C09K 8/00* (2013.01); *E21B 41/0064* (2013.01); *Y02C 10/14* (2013.01)

(58) Field of Classification Search
CPC ....................................................... B65G 5/00
See application file for complete search history.

(56) References Cited

U.S. PATENT DOCUMENTS 3,393,738 A * 7/1968 Bernard ............... B65G 5/00
166/292
4,609,043 A   9/1986 Cullick
(Continued)

FOREIGN PATENT DOCUMENTS

| CN | 101446189 | 6/2009 |
|---|---|---|
| WO | 2009/094285 | 7/2009 |
| WO | 2012/041926 | 4/2012 |

OTHER PUBLICATIONS

International Search Report dated May 15, 2014 in corresponding International Application No. PCT/EP2014/057955.
(Continued)

*Primary Examiner* — Frederick L Lagman
(74) *Attorney, Agent, or Firm* — Wenderoth, Lind & Ponack, L.L.P.

(57) ABSTRACT

The present invention relates to a method of storing $CO_2$ in a geological formation, said method comprising (i) injecting a first composition comprising $CO_2$ into said formation; and (ii) injecting a second composition comprising $CO_2$ and at least one $CO_2$ soluble polymer into said formation, wherein steps (i) and (ii) are performed separately and in any order and wherein said first and second compositions are different.

17 Claims, 1 Drawing Sheet

(56) References Cited

U.S. PATENT DOCUMENTS

| | | | |
|---|---|---|---|
| 4,852,651 A | 8/1989 | Davis | |
| 5,045,220 A | 9/1991 | Harris | |
| 5,922,833 A | 7/1999 | DeSimone | |
| 6,347,675 B1 | 2/2002 | Kolle | |
| 2006/0216811 A1* | 9/2006 | Cunningham | B65G 5/00 |
| | | | 435/262 |
| 2009/0250224 A1 | 10/2009 | Wright et al. | |
| 2010/0116511 A1* | 5/2010 | Ramakrishnan | E21B 41/0064 |
| | | | 166/400 |
| 2011/0162842 A1* | 7/2011 | Cangemi | B09B 1/00 |
| | | | 166/279 |

OTHER PUBLICATIONS

Nazarian et al., "Reservoir Management of $CO_2$ Injection: Pressure Control and Capacity Enhancement", *Energy Procedia*, 2013, No. 37, pp. 4533-4543.

Xu et al., "Thickening Carbon Dioxide with the Fluoroacrylate-Styrene Copolymer", *Society of Petroleum Engineers*, SPE Annual Technical Conference and Exhibition, New Orleans, LA, Sep. 30-Oct. 3, 2001.

McPherson et al., "Two equations of state assembled for basic analysis of multiphase $CO_2$ flow and in deep sedimentary basin conditions", *Computers and Geosciences*, 2008, No. 34, pp. 427-444.

Battistelli et al., "TMGAS: A new TOUGH2 EOS module for the numerical simulation of gas mixtures injection in geological structures", *International Journal of Greenhouse Gas Control*, 2009, No. 3, pp. 481-493.

Sasaki et al., "Numerical simulation of supercritical $CO_2$ injection into subsurface rock masses", *Energy Conversion and Management*, 2008, No. 49, pp. 54-61.

Ringrose et al., "The In Salah $CO_2$ storage project: lessons learned and knowledge transfer", *Energy Procedia*, 2013, No. 37, pp. 6226-6236.

Enick et al., "Mobility and Conformance Control for Carbon Dioxide Enhanced Oil Recovery ($CO_2$-EOR) via Thickeners, Foams, and Gels—A Detailed Literature Review of 40 Years of Research", *National Energy Technology Laboratory*, 2011, DOE/NETL-2012/1540, Activity 4003.200.01.

\* cited by examiner

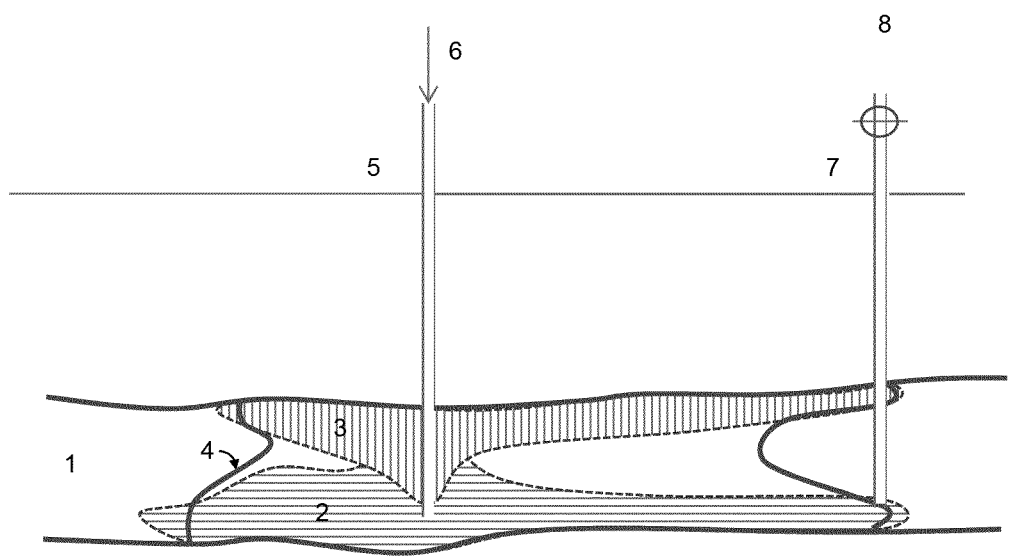

METHOD OF STORING $CO_2$

TECHNICAL FIELD

The present invention relates to a method of storing $CO_2$ and to a method of monitoring $CO_2$ storage in geological formations. The invention also relates to a composition and method for optimizing storage and controlling $CO_2$ in geological formations.

BACKGROUND OF THE INVENTION

Several studies indicate that the increase of $CO_2$ in the atmosphere has a major effect on global climate. Optimized and safe storage of $CO_2$ is a desired and important issue in order to reduce $CO_2$ in the atmosphere.

As an example concerning commercial storage of $CO_2$, the Sleipner carbon capture and storage (CCS) project operated by Statoil is located 250 km off the Norwegian coast. The $CO_2$ is stored in supercritical state in the Utsira formation at a depth of 800-1000 m below the sea surface. The $CO_2$ produced during natural gas processing is captured and subsequently injected underground. $CO_2$ injection started in October 1996 and by 2012, more than 13 million tons of $CO_2$ had been injected at a rate of approximately 2700 tons per day. A shallow long-reach well is used to take the $CO_2$ 2.4 km away from the producing wells and platform area. The injection site is located beneath a local dome of the top Utsira formation.

The In Salah CCS Project is an onshore project for the production of natural gas located in the Algerian Central Sahara. The Krechba Field produces natural gas containing up to 10% of $CO_2$ from a number of geological reservoirs. $CO_2$ has been stripped from the gas and re-injected into a sandstone reservoir at a depth of 1800 m enabling the storage of up to 1 Mt of $CO_2$ per year.

While the global capacity to store $CO_2$ deep underground is believed to be large, the development of a new storage site is inevitably costly as it requires an assessment of potential risk to humans and the ecosystem. It is thus desirable that existing sites are exploited to maximum capacity. Current estimates suggest that the existing methods used to inject supercritical $CO_2$ into deep storage sites result in only around 2% of the pore volume of the geological storage site being utilized for $CO_2$ sequestration. This is believed to be due to the uneven sweep of the injected $CO_2$ in subterranean formations, which leads to a phenomenon called "fingering" in which the $CO_2$ injection front is highly uneven with small areas of high penetration surrounded by areas in which the $CO_2$ has not penetrated at all. Pursuing current practices will result in the loss of considerable storage volume in available storage sites.

For the purpose of sequestration, $CO_2$ is injected as a supercritical fluid into the storage reservoir, normally without designing the composition of the preferred phase of the injected stream at reservoir conditions. In WO 2012/041926, the Composition Swing Injection (CSI) technique is described, in which the composition of the injected stream is changed in cycles to create gas-like and liquid-like states in order to stabilize the $CO_2$ plume during the injection period. This stabilisation helps to maximise the $CO_2$ storage capacity of the reservoir.

Depending on pressure and temperature of the storage reservoir, achieving the required phase behaviour in the Composition Swing Injection (CSI) technique may require considerable modification of composition of the injected stream. One option disclosed in WO 2012/041926 is that various hydrocarbon components could be injected together with $CO_2$ in order to obtain the required effect. In some cases these hydrocarbon components could be available from natural sources or as a by-product of oil and gas processing. However, in other cases hydrocarbons may be too valuable to use as a gas blend component, and could result in Composition Swing Injection being economically undesirable.

There remains, therefore, a need to develop a method for storing $CO_2$ in storage reservoirs where the CSI technique is inexpensive and which overcomes the issues of loss of storage volume discussed above. It is also desirable to be able to monitor $CO_2$ storage reservoirs for $CO_2$ plume movement and possible $CO_2$ seepage through the storage reservoir. Moreover, it would be advantageous to develop an economically viable method for monitoring $CO_2$ levels. Ultimately, a method which is able to address both these problems simultaneously is desirable.

Surprisingly, the present inventors have found that methods utilising the Composition Swing Injection technique and in which the hydrocarbons are replaced by one or more $CO_2$ soluble polymers represent an attractive solution to these issues.

SUMMARY OF THE INVENTION

The present invention is conceived to solve or at least alleviate the problems identified above. An object of the invention is to provide a composition, method and use for optimizing storage, controlling $CO_2$ and monitoring $CO_2$ in geological formations in a flexible and economically acceptable manner.

In a first embodiment, the invention provides a method of storing $CO_2$ in a geological formation, said method comprising:

(i) Injecting a first composition comprising $CO_2$ into said formation; and (ii) Injecting a second composition comprising $CO_2$ and at least one $CO_2$ soluble polymer into said formation, wherein steps (i) and (ii) are performed separately and in any order, and wherein the first and second compositions are different.

In a second embodiment, the invention provides a method of storing $CO_2$ in a geological formation, said method comprising:

(iii) Injecting $CO_2$ or a first composition comprising $CO_2$ into said formation; and (iv) Injecting a second composition comprising $CO_2$ and at least one $CO_2$ soluble polymer into said formation, wherein steps (i) and (ii) are performed separately and in any order, and wherein the first and second compositions are different.

In a further embodiment, the invention provides a method of monitoring $CO_2$ storage in a geological formation, said method comprising:

(i) Injecting a first composition comprising $CO_2$ into said formation;

(ii) Injecting a second composition comprising $CO_2$ and at least one $CO_2$ soluble polymer into said formation;

wherein steps (i) and (ii) are performed separately and in any order and wherein the first and second compositions are different; and (iii) Monitoring the stored $CO_2$.

In another embodiment, the invention provides a method for at least one of the following optimising storage, controlling of $CO_2$ and monitoring $CO_2$ storage in geological formations, wherein a $CO_2$ containing composition is mixed with at least one $CO_2$ soluble polymer containing composition prior to injection of the composition into the formation.

DETAILED DESCRIPTION

"Supercritical conditions or near super-critical conditions" within the context of the present invention, shall be understood as the conditions in which a fluid is at a temperature or pressure at, above or near its critical point, where distinct liquid and gas phases do not exist. At super-critical or near super-critical conditions, the fluid is neither a gas nor a liquid but is in a phase which can have more gas-like or more liquid-like properties by virtue of its viscosity and density. Thus, a liquid can exist in different supercritical "phases". The different phases may be called gas-like or liquid-like phases. In addition, close to the critical point, small changes in pressure or temperature may result in large changes in phase properties, allowing the design of many phase properties of a supercritical fluid.

It is a preferable embodiment of the invention for any or all of the compositions to be at or near supercritical conditions. By "near supercritical conditions" it is meant that the fluid is at a temperature and pressure close to, but lower than its critical point. Typically, "near supercritical conditions" cover conditions in which the pressure may be up to 10 bar less than the critical pressure and up to 5° C. less than the critical temperature. In the present invention supercritical conditions or near supercritical conditions are preferred so that the compositions can be injected with properties between those of a gas and a liquid, and further to be able to easily cycle between gas-like and liquid-like properties to obtain optimized storage.

"Optimized storage and controlling" within the context of the present invention, shall be understood as improving or maximizing storage of $CO_2$ by controlling $CO_2$ movement inside the storage reservoir.

"Monitoring" within the context of the present invention shall be understood as monitoring breakthrough of the injected $CO_2$ mixture at production or observation wells. In those embodiments relating to methods for monitoring $CO_2$, the at least one $CO_2$ soluble polymer according to the present invention is considered to possess a dual function with regard to phase behaviour for optimized storage and monitoring gas breakthrough in production or observation wells. "Dual function" within the context of the present invention shall be understood as the embodiment wherein the at least one $CO_2$ polymer acts as a tracer, enabling both optimized storage of $CO_2$ and monitoring of gas breakthrough in production or observation wells. Tracers are used in order to qualitatively or quantitatively gauge how fluid flows through the reservoir, as well as being a useful tool for estimating residual oil saturation. Tracers can be radioactive or chemical, gas or liquid.

"Geological formations" and "storage reservoirs" within the context of the present invention, shall be understood as relating to underground formations, storage reservoirs, geological reservoirs or formations consisting of a certain number of rock strata.

The "combined $CO_2$ composition" within the context of the present invention, shall be understood as a composition comprising $CO_2$ and the at least one $CO_2$ soluble polymer.

The $CO_2$ used in the methods and compositions of the present invention may come from any source, such as $CO_2$ capture processes, gas processing facilities or subterranean sources, each of which will be understood to provide slightly different $CO_2$ compositions. The $CO_2$ used in the methods and compositions herein may be substantially pure, i.e. it may consist of 100% pure $CO_2$ (or comprise 99.9% pure $CO_2$). Alternatively, the $CO_2$ may further comprise unavoidable impurities, such as hydrocarbons, e.g. alkanes, benzene and/or toluene. Where unavoidable impurities are present, the $CO_2$ used in the methods and composition of the present invention preferably comprises at least 90 mol %, more preferably at least 92 mol %, such as 95 mol % pure $CO_2$, especially at least 98 mol % pure $CO_2$ relative to the total amount of $CO_2$ and unavoidable impurities. A typical $CO_2$ feed stream, comprising such unavoidable impurities, is shown below:

| Component | Mole fraction |
| --- | --- |
| CO2 | 0.98382 |
| Methane | 0.01291 |
| Ethane | 0.00000 |
| Propane | 0.00066 |
| i-Butane | 0.00006 |
| n-Butane | 0.00011 |
| i-Pentane | 0.00000 |
| n-Pentane | 0.00000 |
| n-Hexane | 0.00003 |
| n-Heptane | 0.00133 |
| n-Octane | 0.00070 |
| n-Nonane | 0.00038 |

By "$CO_2$ soluble polymer", we mean a polymer which preferably has a solubility in $CO_2$, preferably supercritical $CO_2$, of at least 0.1 g/L at critical temperature and pressure.

The present invention comprises a composition for at least one of the following: optimized storage, controlling of $CO_2$ distribution and $CO_2$ monitoring in geological formations, comprising at least one of the following: a $CO_2$ soluble polymer and $CO_2$ containing composition. The present invention relates to a composition for optimizing storage, controlling $CO_2$ and monitoring in geological formations comprising at least one of the following: a $CO_2$ soluble polymer containing composition and a $CO_2$ containing composition at or near supercritical conditions.

The present invention comprises a composition for at least one of the following: optimized storage, controlling of $CO_2$ distribution and $CO_2$ monitoring in geological formations; comprising at least one of the following: a $CO_2$ soluble polymer and a $CO_2$ rich stream. A $CO_2$ containing composition according to the following invention should be understood to mean the same as a $CO_2$ rich stream or a $CO_2$ feed stream.

In one embodiment the polymer-containing composition comprises at least one of the following: perfluorocarbons such as polyperfluoroether, polypropylene glycol, polyethylene glycol, monoethylene glycol, silicate containing compounds.

Preferable embodiments described below relating to the methods of the invention, e.g. the nature of the $CO_2$ soluble polymer, should be seen to apply equally to the compositions of the invention.

The present invention relates to a method for optimized storage, controlling $CO_2$ and monitoring in geological formations, in which a $CO_2$ containing composition is mixed with at least one $CO_2$ soluble polymer containing composition prior to injection of the said composition into the said formation. The resulting mixture is then typically injected into the formation. Furthermore, the present invention comprises a method for optimized storage, controlling $CO_2$ and monitoring in geological formations, in which a $CO_2$ containing composition is mixed with at least one $CO_2$ soluble polymer containing composition prior to injection of the said composition into the said formation at or near supercritical conditions. The resulting mixture is then typically injected into the formation. The present invention comprises a method in which a $CO_2$ containing composition is mixed with at least one $CO_2$ soluble polymer containing composition; the said composition is cycled between at least two sets of injection parameters during injection of the said composition into the said formation. The composition according to the present invention comprises gas-like or liquid-like behaviour at supercritical conditions or near supercritical conditions by cycling between at least two sets of injection parameters.

In another embodiment, the invention provides a method for at least one of the following optimising storage, controlling of $CO_2$ and monitoring $CO_2$ storage in geological formations, wherein a $CO_2$ containing composition is mixed with at least one $CO_2$ soluble polymer containing composition prior to injection of the composition into the formation.

Preferably, in the methods of the invention, supercritical conditions or near supercritical conditions are obtained by cycling between at least two sets of injection parameters. Said injection parameters include at least one of the following: the injection temperature, injection pressure, $CO_2$ concentration and concentration of $CO_2$ soluble polymer composition. In a further preferred embodiment of the methods as hereinbefore described, a $CO_2$ containing composition is mixed with at least one $CO_2$ soluble polymer containing composition, said composition is cycled between at least two sets of injection parameters during injection of said composition into said formation. Preferably, said composition comprises 0.1 to 50 weight %, 0.1 to 40 weight %; 0.1 to 30 weight %; 0.1 to 20 weight %; 0.1 to 15 weight %; 0.1 to 10 weight %; 0.1-4 weight %; 0.1-0.5 weight % of a $CO_2$ soluble polymer containing composition. In addition, the said composition for optimized storage and controlling of $CO_2$ comprises from 0.1 to 50 weight % of a $CO_2$ containing composition. The said $CO_2$ containing composition at or near supercritical conditions may comprise at least one of the following ranges: 0.1 to 50 weight %; 0.1 to 40 weight %; 0.1 to 30 weight %; 0.1 to 20 weight %; 0.1 to 15 weight %; 0.1 to 10 weight %; 0.1-4 weight % of a $CO_2$ containing composition. In one embodiment the polymer-containing composition comprises at least one of the following: perfluorocarbons such as polyperfluoroether, polypropylene glycol, polyethylene glycol, monoethylene glycol, silicate containing compounds.

The viscosity of the $CO_2$ composition is increased at least 2 to 200 fold in the presence of a $CO_2$ soluble polymer composition. Further, the said viscosity is increased within at least one of the following ranges 2 to 200, 2-150, 2-100, 2-50, 2-40, 2-30 or 2-20 folds in the presence of a $CO_2$ soluble polymer containing composition. In view of the polymer containing composition of the present invention the density may increase 2 to 3 times.

The present invention also comprises a method of storing $CO_2$ in a geological formation, said method comprising
 (i) Injecting a first composition comprising $CO_2$ into said formation; and
 (ii) Injecting a second composition comprising $CO_2$ and at least one $CO_2$ soluble polymer into said formation,
wherein steps (i) and (ii) are performed separately and in any order, and wherein the first and second compositions are different.

In all embodiments of the invention, steps (i) and (ii) are preferably performed sequentially such that step (ii) follows step (i). However, this is not essential and it is within the ambit of the invention for step (ii) to precede step (i).

Preferably, the first composition and/or the second composition are injected at or near supercritical conditions. Most preferably, both the first and second compositions are injected at or near supercritical conditions. The compositions may be compressed to assume a supercritical, or near supercritical state at the site of injection.

In all embodiments of the invention, it is preferable if the first composition is injected in a gas-like supercritical phase and the second composition is injected in a liquid-like supercritical phase.

In a preferred embodiment, the above-mentioned method comprises cycling alternately between step (i) and step (ii), i.e. step (i) is carried out, followed by step (ii), which is then followed by step (i), and so on. Preferably, at least 2 cycles of the method are carried out, more preferably at least 4, especially at least 6, wherein one cycle is understood to comprise performing steps (i) and (ii) once. Up to 1000 cycles may be performed, such as up to 750 (e.g. up to 500). It will be appreciated that the number of cycles will be determined by the nature of the geological formation and the size of the storage reservoir. In general, the cycles will be repeated until the storage capacity of the geological formation has been reached. It is not outside the methods of the invention for one or more additional steps to be carried out subsequent to steps (i) and (ii) and for these additional steps to be incorporated into the cycles.

The duration of the time period of the injection of the first composition, i.e. step (i), may be the same as the time period of the injection of the second composition, i.e. step (ii). Alternatively, the time periods may be different, e.g. the time period of the injection of the second composition may be shorter than the time period of the injection of the first composition, or vice versa. Also, the time period of injection of the first and second compositions may vary between cycles.

Preferably the time periods are each longer than one month, i.e. the time a composition is injected before it is changed is preferably longer than one month. The time periods may each be between one month and one year, preferably between one and six months, such as two to three months. For example, step (i) may be performed for two months and step (ii) for one month. In an alternative embodiment, steps (i) and (ii) are each carried out for one month.

The first composition comprises $CO_2$. Preferably, the first composition consists of $CO_2$ and any unavoidable impurities, if present. Thus, the first composition may consist of 100% pure $CO_2$ (or comprise 99.9% pure $CO_2$). Alternatively, the first composition may comprise at least 90 mol %, more preferably at least 92 mol %, such as 95 mol % pure $CO_2$, especially at least 98 mol % pure $CO_2$, with the remaining mol % being made up by any unavoidable impurities.

The $CO_2$ in the first composition and the second composition may come from two separate sources which provide different $CO_2$ containing compositions. For example, they may come from different $CO_2$ capture processes, gas processing facilities or subterranean sources which provide different $CO_2$ compositions. Alternatively and preferably, there may be a single source of $CO_2$ for both the first and second compositions (which may be pure $CO_2$ or $CO_2$ containing unavoidable impurities).

The second composition used in the methods of the invention comprises at least one $CO_2$ soluble polymer in addition to $CO_2$. Preferably, the second composition comprises $CO_2$ from the same source as the $CO_2$ in the first composition, however this is not necessary.

The second composition is different from the first composition. The second composition comprises at least one $CO_2$ soluble polymer. A mixture of more than one $CO_2$ soluble polymer may be used, such as a mixture or two to five polymers, however it is preferable if the second composition comprises only one $CO_2$ soluble polymer.

The $CO_2$ soluble polymer(s) used in the methods of the current invention may be any polymer which is soluble in $CO_2$, preferably under supercritical conditions, and which results in an increase in the viscosity and/or density of the $CO_2$ once added thereto.

Preferably, the $CO_2$ soluble polymer(s) has a weight average molecular weight (Mw) of at least 10,000 g/mol, preferably at least 50,000 g/mol, more preferably at least 80,000 g/mol, such as at least 100,000 g/mol, especially at least 200,000 g/mol, e.g. at least 500,000 g/mol. Preferably, the weight average molecular weight of the $CO_2$ soluble polymer(s) is less than 2,000,000 g/mol, preferably less than 1,500,000 g/mol, such as less than 1,000,000 g/mol, e.g. less than 950,000 g/mol. Preferably, the $CO_2$ soluble polymer(s) has a number average molecular weight (Mn) of at least 10,000 g/mol, preferably at least 25,000 g/mol, such as at least 50,000 g/mol, especially at least 100,000 g/mol, e.g. at least 200,000 g/mol. Preferably, the number average molecular weight of the $CO_2$ soluble polymer(s) is less than 1,500,000 g/mol, preferably less than 1,000,000 g/mol, such as less than 800,000 g/mol, e.g. less than 750,000 g/mol.

The $CO_2$ soluble polymer(s) may contain one or more polymer components, i.e. can be unimodal or multimodal, e.g. bimodal, with respect to molecular weight distribution (MWD) and/or comonomer distribution. The polymer may be a homopolymer or a copolymer. The $CO_2$ soluble polymer may comprise at least one electron donor group, such as siloxane, ether, thioether, sulfone, carbonyl, ester, tertiary amine, dialkylamide or silylether. Preferable polymers are selected from the group consisting of polyolefins such as polyethylene, polypropylene, polybutene, polydecene-1 and polyisobutylene; polyurethanes; polyvinyl esters; polyvinyl ethers; silicon-containing polymers such as polysiloxanes, including polydimethyl siloxane; fluoropolymers such as fluoroalkyl polymers, fluoroethers, polyperfluoroether and fluoroacrylates; perfluorocarbons; and polyalkylene glycols such as polyethylene glycol and polypropylene glycol.

By "polyethylene glycol" (PEG) we mean any polymer containing mostly ethylene oxide repeating units, i.e. —$CH_2$—$CH_2$—O— units. By the term "polypropylene glycol" (PPG) we mean any polymer containing mostly propylene oxide repeating units, i.e. —$CH_2$—$CH_2$—$CH_2$—O— units. The polyalkylene glycols may have a hydroxy or amino end group, or a mixture thereof.

Where the $CO_2$ soluble polymer(s) is a copolymer, it comprises at least one comonomer. As is well known "comonomer" refers to copolymerisable comonomer units. The comonomer may be a polar comonomer containing at least one of the following functional groups: hydroxyl groups, alkoxy groups, carbonyl groups, carboxyl groups, ether groups or ester groups. Preferably, polar comonomers include acrylate(s), methacrylate(s) or acetate(s), or any mixtures thereof, more preferably alkyl acrylates, alkyl methacrylates or vinyl acetate, or a mixture thereof. Further preferably, said polar comonomers are selected from C1- to C6-alkyl acrylates, C1- to C6-alkyl methacrylates or vinyl acetate. Alternatively, the comonomer may be non-polar, such as olefins, preferably alpha-olefins, more preferably C3 to C10 alpha-olefins, such as propylene, 1-butene, 1-hexene, 4-methyl-1-pentene, styrene, 1-octene or 1-nonene.

If the $CO_2$ soluble polymer is a copolymer, it is preferred that it includes 0.001 to 50 wt % of one or more comonomers, relative to the total weight of the $CO_2$ soluble polymer as a whole, more preferably 0.1 to 40 wt %, still more preferably less than 35 wt %, still more preferably less than 30 wt %, more preferably less than 25 wt %, of one or more comonomers.

Particular preferred $CO_2$ soluble polymers include fluoroacrylate copolymers such as a fluoroacrylate-styrene copolymer. In another preferred embodiment, the at least one $CO_2$ soluble polymer is a perfluorocarbon or a fluoropolymer such as polyperfluoroether or a fluoroacrylate. When the second composition comprises at least one perfluorocarbon, it may possess dual function and act as a tracer to monitor for gas breakthrough.

In all embodiments of the invention, the second composition preferably comprises 0.1 to 50 weight % of the at least one $CO_2$ soluble polymer relative to the total weight of the second composition as a whole, such as 0.1 to 40 weight %; 0.1 to 30 weight %; 0.1 to 20 weight %; 0.1 to 15 weight %; 0.1 to 10 weight %; 0.1-4 weight %; 0.1-0.5 weight %; 0.5 to 20 wt %, or 0.75 to 10 wt %, especially 1 to 4 wt %. It will be understood that theses weight percentage values relate to the total amount of $CO_2$ soluble polymers in the second composition. The particular weight percentage of the at least one $CO_2$ soluble polymer may be chosen according to the nature of the polymer(s) used and the geological formation. The skilled man will appreciate that, depending on the nature and size of the reservoir a particular change in viscosity and/or density may be desired through addition of the at least one $CO_2$ soluble polymer. Moreover, it will be appreciated that the solubility of the at least one $CO_2$ soluble polymer will vary depending on the polymer, or mixture of polymers, used. It is possible that a polymer with higher solubility would lead to a large increase in viscosity and/or density when added in very small amounts. However, for the same increase in viscosity and/or density, higher amounts of a less soluble polymer may be required.

Preferably, the second composition comprises 50-99.9 wt % of $CO_2$ relative to the total weight of the second composition as a whole, such as 80-99.5 wt %, or 90-99.25 wt %, especially 96-99 wt %. It will be understood that theses weight percentage values for $CO_2$ in the second composition are intended to cover $CO_2$ in addition to any unavoidable impurities which may be present in the $CO_2$.

In addition to $CO_2$ and the at least one $CO_2$ soluble polymer, the second composition used in the methods of the invention may comprise additional components such as nanoparticles or solvents. The role of the solvents may be to enhance the solubility of the $CO_2$ soluble polymer. Preferably, the solvents are organic solvents. Example solvents include toluene, ethanol, isooctane and 2-ethyl hexanol. These additional components may be present in an amount of 0.01 to 25 wt %, such as 0.05 to 20 wt %, especially 0.1 to 10 wt %, such as 0.5 to 5 wt %, e.g. 1 wt %, relative to the total weight of the second composition as a whole.

As discussed above, the addition of at least one $CO_2$ soluble polymer to $CO_2$ results in a change in viscosity and/or density of the composition relative to an identical composition where no $CO_2$ soluble polymer has been added. In particular, the addition of at least one $CO_2$ soluble polymer to $CO_2$ results in an increase in viscosity and/or density, compared to $CO_2$ prior to the addition of the polymer. At supercritical conditions, this may lead to the transformation from a gas-like phase to a liquid-like phase. By increasing the density and/or viscosity a more compact plume is created after injection.

Thus, in a method according to the invention, the second composition preferably has a higher density and/or viscosity than the first composition. In particular, it is preferable if the viscosity of the second composition is at least 2 to 200 fold, such as 2-150, 2-100, 2-50, 2-40, 2-30 or 2-20 fold, greater than that of the first composition. The density of the second composition may be at least double or triple that of the first composition. Increasing the viscosity of the combined $CO_2$ containing composition by addition of at least one $CO_2$ soluble polymer changes the flow behaviour of the combined composition, for example from a gas-like flow to a liquid-like flow or vice versa. Furthermore, a stabilized Composition Swing Injection (CSI) front is obtained providing improved reservoir sweep by reducing the fingering phenomena.

Whilst the addition of the at least one $CO_2$ soluble polymer may cause significant enough changes in viscosity and/or density for the first composition to be in a gas-like supercritical phase and the second composition to be in a liquid-like supercritical phase, it will be understood that this is not essential and that these properties of the first and second compositions may be further modified by varying one or more injection parameters. The injection parameters may include the injection temperature or injection pressure.

In addition to the nature of the composition being changed between steps (i) and (ii), the temperature and/or pressure of the first and second compositions may also be different. This means that the properties, e.g. density and/or viscosity, may further be tailored between the two injection steps, i.e. steps (i) and (ii). Alternatively, the pressure and temperature at which the first and second compositions are injected may be relatively constant, i.e. the same.

In the present invention supercritical conditions or near-supercritical conditions are obtained by cycling between at least two sets of injection parameters. According to the present invention the injection parameters include at least one of the following: the injection temperature, injection pressure, hydrocarbon concentration and concentration of $CO_2$ soluble polymer composition. In addition the present method comprises a $CO_2$ containing composition which is mixed with at least a $CO_2$ soluble polymer; said composition is cycled between at least two sets of injection parameters prior to injection of said composition into said formation at or near supercritically conditions.

In an embodiment of the present invention the said composition for optimized storage, controlling $CO_2$ and monitoring in geological formations is used for optimizing storage of $CO_2$ in geological formations.

The present composition for optimized storage, controlling $CO_2$ and monitoring in geological formations can also be used for controlling $CO_2$ in geological formations.

Furthermore, the present composition described above can be used for monitoring $CO_2$ storage in geological formations.

In an embodiment of the present invention a method for optimized storage, controlling $CO_2$ and monitoring in geological formations is used for optimizing storage of $CO_2$ in geological formations.

In an embodiment according to the present invention use of a method for controlling $CO_2$ in geological formations is comprised.

In an embodiment according to the present invention a method is used for monitoring geological formations. In an embodiment of the present invention, cyclic use of a $CO_2$-soluble-polymer as additive to a $CO_2$-rich gas/liquid stream composition is injected underground to control the movement of the $CO_2$ plume and to increase the sweep and consequently the storage efficiency. In order to maintain a stable injection front it is preferable to cycle between at least two sets of injection parameters in order to obtain a gas-like stream or a liquid-like stream when required in order to optimize the storage of $CO_2$.

In the present invention optimized storage and control of $CO_2$ is achieved by cycling between the injection of $CO_2$ and $CO_2$ together with at least one $CO_2$ soluble polymer. The result is one which maximizes the storage capacity of the geological formation.

Furthermore, the compositions of the present invention described above can be used for monitoring $CO_2$ storage in geological formations, wherein the $CO_2$ soluble polymer is a tracer. In the present invention a composition comprising at least one $CO_2$ soluble polymer and $CO_2$ containing composition at or near supercritical conditions may possess a dual use, thus helping to achieve optimal storage and providing gas breakthrough analysis for reservoir management.

In a further embodiment, the invention provides a method of monitoring $CO_2$ storage in a geological formation, comprising
(i) Injecting a first composition comprising $CO_2$ into said formation;
(ii) Injecting a second composition comprising $CO_2$ and at least one $CO_2$ soluble polymer into said formation;
wherein steps (i) and (ii) are performed separately and in any order and wherein said first and second compositions are different; and
(iii) Monitoring the stored $CO_2$,
Preferable embodiments for the method of monitoring $CO_2$, such as the nature of the first and second compositions and the nature of the at least one $CO_2$ soluble polymer, are as defined above for the methods of storing $CO_2$. Monitoring may take place by any method known in the art, such as via production or observation wells or by wellhead or downhole monitoring.

The addition of at least one $CO_2$ soluble polymer to $CO_2$ according to the methods of the present invention surprisingly creates a similar effect as the addition of intermediate or heavier hydrocarbons and thus extends the Compositional Swing Injection technique into a novel technical perspective and provides an economically viable alternative In the present invention, at least one $CO_2$ soluble polymer is added to the injection stream as a substitute for intermediate and heavy hydrocarbons in order to achieve the required phase behaviour in the Composition Swing Injection technique. The presence of the $CO_2$ soluble polymer increases the viscosity and/or density of the second composition relative to the first composition. By increasing the density and/or viscosity of the combined $CO_2$ composition, the gravity override of the injected stream is reduced and a more compact $CO_2$ plume is resulted. The amount of $CO_2$ reaching the top of the storage reservoir is reduced and the safety of the injection project is increased In one embodiment of the present invention a $CO_2$ soluble polymer is cyclically mixed with a $CO_2$-rich gas/liquid stream composition according to the present method before being injected into the underground (geological formation) in order to control the movement of the $CO_2$ plume and to increase the sweep and consequently the storage efficiency.

The injection cycle of composition with gas-like and liquid-like behaviour can vary but a typical injection cycle will comprise one month or two months of liquid-like injection, where the $CO_2$ soluble polymer is added, followed by one month of gas-like injection wherein a $CO_2$ soluble polymer is not added. The cost of adding the polymer is offset against the added effectiveness of $CO_2$ storage using this technique.

The capacity, flexibility and optimization of the $CO_2$ storage sites surprisingly increases considerably upon implementing the present invention also named as the $CO_2$ Thickener Composition Swing Injection (CTCSI) technique, reducing the total cost of the $CO_2$ Capture and Storage (CCS). The Composition Swing Injection technique using $CO_2$ soluble polymers may be cheaper to implement than conventional methods since the use of valuable hydrocarbons may be avoided.

Furthermore, the added $CO_2$ soluble polymer may also be used as a $CO_2$-soluble tracer for reservoir management, as already used in some conventional $CO_2$ storage sites, for example polyperfluoroether used at the In Salah project. $CO_2$ soluble polymers may therefore have a dual use for helping to optimise storage and for monitoring gas breakthrough analysis in the reservoir.

SUMMARY OF THE DRAWING

The invention will be described in detail with reference to the attached FIGURE. It is to be understood that the drawing is designed solely for the purpose of illustration and is not intended as a definition of the limit of the invention for which reference should be made to the appended claims. It should be understood that the drawing is not necessarily drawn to scale and that, unless otherwise indicated, they are merely intended to schematically illustrate the structures and procedures described herein.

FIG. 1 shows a schematic representation of an injection front formed according to the present invention. FIG. 1 shows a simulation of the injection of a composition comprising at least one $CO_2$ soluble polymer and $CO_2$ at or near supercritical conditions in a geological formation (1). The characteristics of injection parameters are cycled between at least two sets of injection parameters prior to injection of said composition, resulting in among others density and/or viscosity of said composition being varied during injection. The composition is injected via an injection well (5) and a conduit (6) into the geological formation (1). The geological formation can also be understood as the storage reservoir. The composition is injected under two different sets of injection conditions, gas-like and liquid-like, resulting in two different phases, one comprising at least one $CO_2$ soluble polymer and one without (e.g. the first and second compositions according to the methods of the invention) When the injection parameters are cycled to give a higher viscosity and/or higher density said composition behaves more like a liquid. During injection of the liquid-like composition, the injected stream tends to occupy the lower areas (2) of the geological storage formation (2). Gas-like composition tends to occupy the upper areas (3) of the geological storage formation (2). The stabilised Compositional Swing Injection (CSI) front (4) is more uniform, and the storage capacity of the geological formation (1) increased. An observation well (7) can be used to observe changes in flow conditions in geological storage formation (2) over a period. Further a wellhead or down-hole monitoring of the composition (8) can be used in order to among others monitor and characterise the stabilized CSI front (4). Measuring the injection parameters such as temperature, pressure, and concentration of $CO_2$ soluble polymer composition, will ensure the accuracy of injection operation and thus a stabilized CSI front.

Having described preferred embodiments of the invention it will be apparent to those skilled in the art that other embodiments incorporating the concepts may be used. These and other examples of the invention illustrated above are intended by way of example only and the actual scope of the invention is to be determined from the following claims.

The invention claimed is:

1. A method of storing $CO_2$ in a geological formation, said method comprising:
   (i) injecting a first composition comprising $CO_2$ into said formation; and
   (ii) injecting a second composition comprising $CO_2$ and at least one $CO_2$ soluble polymer having a weight average molecular weight of at least 10,000 g/mol into said formation,
   wherein steps (i) and (ii) are performed separately and in any order, and
   wherein said first and second compositions are different.

2. The method as claimed in claim 1, wherein the first composition and/or the second composition are injected at or near supercritical conditions, wherein "near supercritical conditions" means that the first and/or the second composition is at a pressure up to 10 bar less than its critical pressure and a temperature of up to 5° C. less that its critical temperature.

3. The method as claimed in claim 2, wherein the first composition is injected in a gas-like supercritical phase and the second composition is injected in a liquid-like supercritical phase.

4. The method as claimed in claim 1, wherein the first composition is injected in a gas-like supercritical phase and the second composition is injected in a liquid-like supercritical phase.

5. The method as claimed in claim 1, wherein the method comprises cycling alternately between step (i) and step (ii).

6. The method as claimed in claim 5, wherein the method comprises at least 2 cycles.

7. The method as claimed in claim 1, wherein each of steps (i) and (ii) is carried out for a time period of between one month and one year.

8. The method as claimed in claim 1, wherein step (i) is carried out for a time period of two months, and step (ii) is carried out for a time period of one month.

9. The method as claimed in claim 1, wherein the at least one $CO_2$ soluble polymer is selected from the group consisting of polyolefins, polyurethanes, polyvinyl esters, polyvinyl ethers, silicon-containing polymers, fluoropolymers, perfluorocarbons, and polyalkylene glycols.

10. The method as claimed in claim 9,
    wherein the polyolefins are selected from the group consisting of polyethylene, polypropylene, polybutene, polydecene-1, and polyisobutylene,
    wherein the silicon-containing polymers are selected from the group consisting of polysiloxanes,
    wherein the fluoropolymers are selected from the group consisting of fluoroalkyl polymers, fluoroethers, polyperfluoroether and fluoroacrylates, and
    wherein the polyalkylene glycols are selected from the group consisting of polyethylene glycol and polypropylene glycol.

11. The method as claimed in claim 10, wherein the polysiloxanes are polydimethyl siloxane.

12. The method as claimed in claim 1, wherein the second composition comprises 0.1 to 50 wt % of the at least one $CO_2$ soluble polymer.

13. The method as claimed in claim 1, wherein the second composition comprises 50-99.9 wt % of $CO_2$.

14. The method as claimed in claim 1, wherein the first composition consists of $CO_2$ and any unavoidable impurities.

15. The method as claimed in claim 1, wherein the viscosity of the second composition is 2-200 fold greater than that of the first composition.

16. The method of monitoring $CO_2$ storage in a geological formation, said method comprising:
  (i) injecting a first composition comprising $CO_2$ into said formation;
  (ii) injecting a second composition comprising $CO_2$ and at least one $CO_2$ soluble polymer having a weight average molecular weight of at least 10,000 g/mol into said formation;
  wherein steps (i) and (ii) are performed separately and in any order, and
  wherein said first and second compositions are different; and
  (iii) monitoring the stored $CO_2$.

17. The method for at least one of the following: optimising storage, controlling of $CO_2$, and monitoring $CO_2$ storage in geological formations, said method comprising mixing a $CO_2$ containing composition with at least one $CO_2$ soluble polymer containing composition prior to injecting the composition into the formation, wherein the at least one $CO_2$ soluble polymer has a weight average molecular weight of at least 10,000 g/mol.

* * * * *